United States Patent
Chen et al.

(10) Patent No.: US 12,019,424 B2
(45) Date of Patent: Jun. 25, 2024

(54) METHOD FOR NUMERICAL CONTROL MILLING, FORMING AND POLISHING OF LARGE-DIAMETER ASPHERIC LENS

(71) Applicant: SOOCHOW UNIVERSITY, Suzhou (CN)

(72) Inventors: Xi Chen, Suzhou (CN); Peiji Guo, Suzhou (CN); Zhuocheng Dai, Suzhou (CN); Yongxiang Zhu, Suzhou (CN); Chenchao Li, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 523 days.

(21) Appl. No.: 17/440,744

(22) PCT Filed: Jul. 30, 2020

(86) PCT No.: PCT/CN2020/105663
§ 371 (c)(1),
(2) Date: Sep. 17, 2021

(87) PCT Pub. No.: WO2021/128844
PCT Pub. Date: Jul. 1, 2021

(65) Prior Publication Data
US 2022/0179389 A1 Jun. 9, 2022

(30) Foreign Application Priority Data

Dec. 25, 2019 (CN) .......................... 201911356383.5

(51) Int. Cl.
*G05B 19/19* (2006.01)
*B24B 13/00* (2006.01)
*G05B 15/02* (2006.01)

(52) U.S. Cl.
CPC .............. *G05B 19/19* (2013.01); *B24B 13/00* (2013.01); *G05B 15/02* (2013.01); *G05B 2219/45145* (2013.01); *G05B 2219/45157* (2013.01)

(58) Field of Classification Search
CPC ........ B24K 13/00; G05B 15/02; G05B 19/19; G05B 2219/45145; G05B 2219/45157
(Continued)

(56) References Cited

U.S. PATENT DOCUMENTS 3,492,764 A * 2/1970 Dalton .................. B24B 13/043
451/42
4,768,308 A * 9/1988 Atkinson, III ........ B24B 13/043
451/5
(Continued)

FOREIGN PATENT DOCUMENTS

CN 103056731 A 4/2013
CN 110076680 A * 8/2019 ............. B24B 35/00
(Continued)

*Primary Examiner* — Ronald D Hartman, Jr.
(74) *Attorney, Agent, or Firm* — SZDC Law PC

(57) ABSTRACT

A method for numerical control milling, forming and polishing of a large-diameter aspheric lens to solve the problems of long time-consuming and severe tool wear in the machining of a meter-scale large-diameter aspheric surface is disclosed. An aspheric surface is discretized into a series of rings with different radii, and the rings are sequentially machined through generating cutting by using an annular grinding wheel tool; the rings are equally spaced, there are a total of N rings, and the width of any ring is jointly determined by the $N^{th}$ ring, the $(N-1)^{th}$ ring, positioning accuracy, and a generatrix equation of the aspheric lens, and the $n^{th}$ ring has a curvature radius of $Rn=sqrt(R0^2-k*(n*dx)^2)$; and the aspheric surface is enveloped by a large number of rings.

5 Claims, 6 Drawing Sheets

(58) Field of Classification Search
USPC .......................................................... 700/164
See application file for complete search history.

(56) References Cited

U.S. PATENT DOCUMENTS

| | | | | |
|---|---|---|---|---|
| 5,748,482 | A | * | 5/1998 | Nishimura ............ G05B 19/184 |
| | | | | 451/5 |
| 5,861,114 | A | * | 1/1999 | Roffman ................. B29C 45/37 |
| | | | | 425/808 |
| 2002/0102925 | A1 | * | 8/2002 | Wess ........................ B24B 13/02 |
| | | | | 451/42 |
| 2005/0177270 | A1 | * | 8/2005 | Stacklies ................. B24B 13/06 |
| | | | | 700/164 |
| 2005/0215175 | A1 | * | 9/2005 | Kiontke .................. B24B 13/06 |
| | | | | 451/41 |
| 2007/0162178 | A1 | * | 7/2007 | Stacklies ................. B24B 13/06 |
| | | | | 451/5 |
| 2011/0215492 | A1 | * | 9/2011 | Tomisaka ................. G02B 3/04 |
| | | | | 264/1.21 |

FOREIGN PATENT DOCUMENTS

| | | | | |
|---|---|---|---|---|
| CN | 110076680 | A | | 8/2019 |
| CN | 111376142 | A | | 7/2020 |
| DE | 19814045 | A1 * | 10/1999 | ............ B24B 13/026 |
| JP | H07299746 | A * | 11/1995 | ............ B24B 53/065 |
| JP | H08216007 | A * | 8/1996 | ............... B24B 13/02 |
| JP | 2003211462 | A * | 7/2003 | ......... B29C 33/3835 |

\* cited by examiner

METHOD FOR NUMERICAL CONTROL MILLING, FORMING AND POLISHING OF LARGE-DIAMETER ASPHERIC LENS

This application is the National Stage Application of PCT/CN2020/105663, filed on Jul. 30, 2020, which claims priority to Chinese Patent Application No. 201911356383.5, filed on Dec. 25, 2019, which is incorporated by reference for all purposes as if fully set forth herein.

TECHNICAL FIELD

The present invention relates to the field of optical machining, and to a method for numerical control machining of a large-diameter aspheric optical element.

BACKGROUND

Aspheric optics can well correct a variety of aberrations in an optical system, improve imaging quality, and improve the discrimination capability of the system. An aspheric lens is a quite significant optical element in the optical system, and can replace multiple spherical elements with one or several aspheric elements, thereby simplifying the structure of an instrument, simplifying the system structure, shortening a tube length, and effectively reducing the weight of the instrument. In addition, the design of an aspheric optical system can greatly simplify a calculation method.

In recent years, technologies for machining aspheric optical components have developed significantly. The machining methods mainly include: a numerical control grinding and polishing technology, a single-point diamond turning technology, ion beam machining, compression molding, and the like. Different machining methods each have advantages and disadvantages. When an aspheric lens is machined using a numerical control grinding and polishing technology, generally one surface of an aspheric optical element closest to a spherical surface is machined first, then a spherical surface is ground based on this surface, and finally an aspheric surface that meets requirements is machined through grinding and polishing. However, this method needs to take an excessively long time and has low production efficiency. The single-point diamond turning technology is mainly used for the cutting of typical parts made of non-ferrous metal materials such as duralumin, brass and oxygen-free copper. Tool deviations are prone to occur during the cutting process, and an online inspection device is often required to obtain ideal aspheric accuracy. Although ion beam machining can obtain an aspheric surface with better accuracy, a machining device cost and a machining cost are relatively high, and the machining device is not universal, which limits its popularization and use. The compression molding technology is mainly used to prepare micro and small aspheric lenses in batches, and is not suitable for large-diameter and high-accuracy aspheric lenses. Therefore, the technologies for high-efficiency and low-cost machining of large-diameter aspheric lenses are still under continuous exploration and research.

Currently, to shorten the machining cycle of an aspheric lens, when an aspheric surface is machined, generating cutting is first performed for roughing to obtain a surface closest to a spherical surface, and then a numerical control machine tool is used to directly mill and finish an aspheric surface that conforms with an aspheric surface equation based on the spherical surface. In this method, generating cutting is used for roughing to quickly remove a large amount of materials, and generally the surface closest to the spherical surface can be changed to an aspheric surface with only one numerical control finishing. The method has high machining efficiency and good economy, and thus it has gradually been widely used. However, when the surface is changed to the aspheric surface in finishing, an excessive screw pitch of a tool path will lead to obvious insufficient removal and poor surface roughness. To improve the surface quality, the screw pitch of the tool path is usually less than 0.2 mm. For a large-diameter aspheric surface, the total length of the tool path is quite large, and the machining takes a longer time. Especially when a meter-scale aspheric surface is machined, affected by tool wear, one tool has to be replaced before it can follow a complete tool path. After the tool change, the tool usually leaves machined traces on the aspheric surface. Moreover, because different tools have different tool parameters, source factors of errors of the machined aspheric surface are inevitably complicated, bringing great difficulty to the later compensation machining and severely affecting machining accuracy. Therefore, when the prior art is used to machine large-diameter aspheric lenses, especially meter-scale aspheric lenses, there are still problems of severe tool wear caused by excessively long tool paths, low machining efficiency, and low accuracy of aspheric surfaces due to difficulty in compensation machining.

SUMMARY

To solve a series of problems in the prior art caused by an excessively long tool path when large-diameter aspheric surfaces are machined, the present invention provides a method for numerical control milling and forming of a large-diameter aspheric lens, the aspheric lens having a concave surface, with a generatrix equation being denoted as f1, the aspheric lens having a diameter of D, and a numerical control machine tool for milling having positioning accuracy of $\beta$, where an aspheric surface of the aspheric lens is discretized into a series of rings with different radii, the rings are equally spaced, there are a total of N rings, the rings each have a width of dx, and the rings are sequentially machined through generating cutting by using an annular grinding wheel tool with a diameter greater than a semi-diameter of the aspheric surface; a process of solving the ring width dx is as follows: a generatrix equation of a $(N-1)^{th}$ ring is denoted as f2, a generatrix equation of an $N^{th}$ ring is denoted as f3, an intersection of f1 and f3 is denoted as (x1, z1), an intersection of f1 and f2 is denoted as (x2, z2), an intersection of f2 and f3 is denoted as (x3, z3), a point on the generatrix equation f1 of the aspheric lens at x3 is denoted as (x3, z4), where x1=D/2, z4−z3=$\beta$, x2=x1−dx, and dx is calculated from the geometric relationship.

The working principle of the solution is that according to the positioning accuracy of the machine tool, the aspheric surface is discretized into a series of annular rings with different radii, the rings are sequentially machined through generating cutting by using the annular grinding wheel tool, and the aspheric surface is enveloped by a large number of rings. The number of the rings is much less than that of conventional machining screw pitches, and because in this solution, the increment dx in the x-direction of the tool path of different rings is limited by the positioning accuracy of the machine tool, i.e., the number of the rings is minimized, the maximum residual error of the different rings does not exceed the positioning accuracy R of the machine tool. The machining method can be used to machine concave rotationally-symmetric curved surfaces with monotonically-increasing properties, including concave quadratic aspheric surfaces and concave high-order aspheric surfaces.

The machining method is described in detail below taking the concave quadratic aspheric surfaces as an example.

An equation of the generatrix equation f1 of the aspheric lens is: $z^2=*R_0*x-(1+k)*x^2$, where $R_0$ is a curvature radius of a vertex of the aspheric surface, k is a quadratic conic coefficient, x is an independent variable on the horizontal coordinate, and z is a vertical coordinate corresponding to the x coordinate; the machining steps of the aspheric lens are sequentially as follows:

1) machining a primary spherical surface with a radius $R_0$, a center thickness $H_1$, and a diameter D on an aspheric lens body material based on the curvature radius $R_0$ of the vertex, the center thickness $H_0$, and the diameter D of the aspheric surface, where $0 \leq H_1 - H_0 \leq 0.5$;

2) securing the aspheric lens body in step 1) on a turntable of the numerical control machine tool, and enabling an optical axis of the aspheric lens body to coincide with a rotation axis of the turntable of the numerical control machine tool, where the numerical control machine tool has at least two translation motion axes: an X-axis and a Z-axis, and two rotation axes: a B-axis and a C-axis, where the B-axis is the rotation axis around the Y-axis, the C-axis is the rotation axis around the Z-axis, and the rotation axis of the turntable of the numerical control machine tool is located at the C-axis; a spindle of the numerical control machine tool is located at the Z-axis;

3) installing an annular tool on the spindle of the numerical control machine tool, where the annular tool has an outer diameter of $T_D$, and $T_D>D/2$; and a convex rounded chamfer between the outer diameter and an inner diameter of the annular tool has a radius of $r_0$; the thickness between the outer diameter and the inner diameter of the annular tool is $2r_0$; and establishing an origin of a workpiece coordinate system at a vertex of the primary spherical surface, where the annular tool is a hollow grinding wheel tool, including: an electroplated diamond grinding wheel, a bronze adhesive grinding wheel and a resin grinding wheel;

4) discretizing the aspheric surface into N rings equally spaced in the X-axis direction, where N is an integer, any ring has a width of dx=D/N, the corresponding aspheric diameter of the $n^{th}$ ring is: $n*dx$, and the $n^{th}$ ring has a curvature radius of Rn $sqrt(R_0^2-k*(n*dx)^2)$, where n is the ordinal number of any ring from the first ring to the $N^{th}$ ring;

dx is jointly determined by the $N^{th}$ ring, the $(N-1)^{th}$ ring, the positioning accuracy β, and the generatrix equation f1 of the aspheric lens:

the generatrix equation of the $(N-1)^{th}$ ring is denoted as f2, the generatrix equation of the $N^{th}$ ring is denoted as f3, the intersection of f1 and f3 is denoted as (x1, z1), the intersection of f1 and f2 is denoted as (x2, z2), the intersection of f2 and f3 is denoted as (x3, z3), and the point on the generatrix equation f1 of the aspheric lens at x3 on the X-axis is denoted as (x3, z4), where x1=D/2, z4−z3=β, x2=x1−dx, and dx is calculated from the above geometric relationship; and 5) using the annular tool on the numerical control machine tool to sequentially machine the first ring to the $N^{th}$ ring, where when the $n^{th}$ ring is machined, the C-axis rotates continuously and uniformly, and the X-axis coordinate of the tool center in the workpiece coordinate system is:

$$X_T=(((T_D-2*r_0)+2*r_0*sin(B))/2)*cos(B);$$

for the Z-axis coordinate:
when k≠−1:

$$Z_T=R_0/(1+k)+k/(1+k)*sqrt(R_0^2-(1+k)*(n*dx)^2)-sqrt(R_0^2-k*(n*dx)^2)+(((T_D-2*r_0)+2*r_0*sin(B))/2)*sin(B),$$

and when k=−1:

$$Z_T=R_0+(n*dx)^2/(2*R_0)-sqrt(R_0^2+(n*dx)^2)+(((T_D-2*r_0)+2*r_0*sin(B))/2)*sin(B);$$ and for the B-axis coordinate:

$$B=asin((T_D-2*r_0)/(2*(R_n-r_0))),$$

where * is a multiplication operator, sqrt is a square root calculation operator, and sin, cos and a sin are sine, cosine and arc sine operators respectively. An expression of a relationship between the tool location points $X_T$ and $Z_T$ is derived based on the basic principle of machining a spherical surface through generating cutting.

A method for numerical control polishing of a large-diameter aspheric lens is further provided based on the milling and forming method, and includes: replacing the annular tool with an annular polishing disk, and installing the annular polishing disk on a spindle of a numerical control machine tool, where the annular polishing disk has an outer diameter of $T_D$, and a convex rounded chamfer between the outer diameter and an inner diameter of the annular polishing disk has a radius of $r_0$; TD>D/2; establishing an origin of a workpiece coordinate system at a vertex of a primary spherical surface, where the annular polishing disk includes: an annular polyurethane polishing pad, an annular flexible polishing skin and an annular airbag; using the annular polishing disk on the numerical control machine tool to sequentially machine the first ring to the $N^{th}$ ring, and spraying a polishing powder solution between the annular polishing disk and the large-diameter aspheric lens during the machining process, where the polishing powder solution is generally selected from a group consisting of aluminum oxide, cerium oxide, diamond micro powder and white corundum micro powder based on hardness of a material to be polished. Because the contact track between the polishing disk and the workpiece surface is an elliptical arc, the envelope of the arc is just a spherical surface after the workpiece rotates, and each ring spherical surface forms an aspheric surface, this polishing method can be used for aspheric polishing.

The aforementioned method for numerical control milling and forming of a large-diameter aspheric lens can be used to manufacture a device for numerical control milling and forming of a large-diameter aspheric lens.

The aforementioned method for numerical control polishing of a large-diameter aspheric lens can be used to manufacture a device for numerical control milling and forming of a large-diameter aspheric lens.

Due to the application of the technical solutions, the present invention has the following advantages compared with the prior art:

a. Requirements for the numerical control machine tool are greatly lowered, and aspheric machining can be implemented by using only two translation axes and two rotation axes.

b. Requirements for the stroke range of the translation axes and the rotation axes of the numerical control machine tool are greatly lowered, because the tool only needs to perform a small amount of movement along the X-axis, Z-axis and B-axis during the machining process.

c. The tool used for machining has a diameter greater than the semi-diameter of the aspheric surface, and a contact area between the tool and the workpiece surface is rings, while a contact area between the conventional machining tool and the workpiece surface is points. Therefore, when machining large-diameter aspheric surfaces, the large annular tool has a much longer service life than that of a tool in a conventional machining method.

d. The machining efficiency is greatly improved compared with that of conventional machining, because dx in machining by using this method is much greater than 0.2 mm.

DESCRIPTION OF EMBODIMENTS

To explain the technical solution of the present invention more clearly, the following further describes the technical solution in conjunction with the accompanying drawings and embodiments.

Embodiment 1

Figure 1:
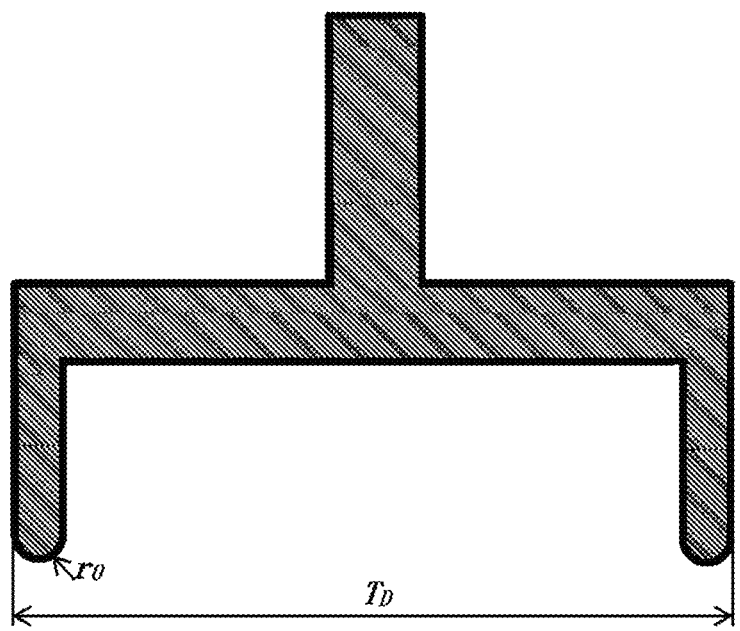
FIG. 1 is a schematic diagram illustrating a radial section of an annular tool.
Figure 2:
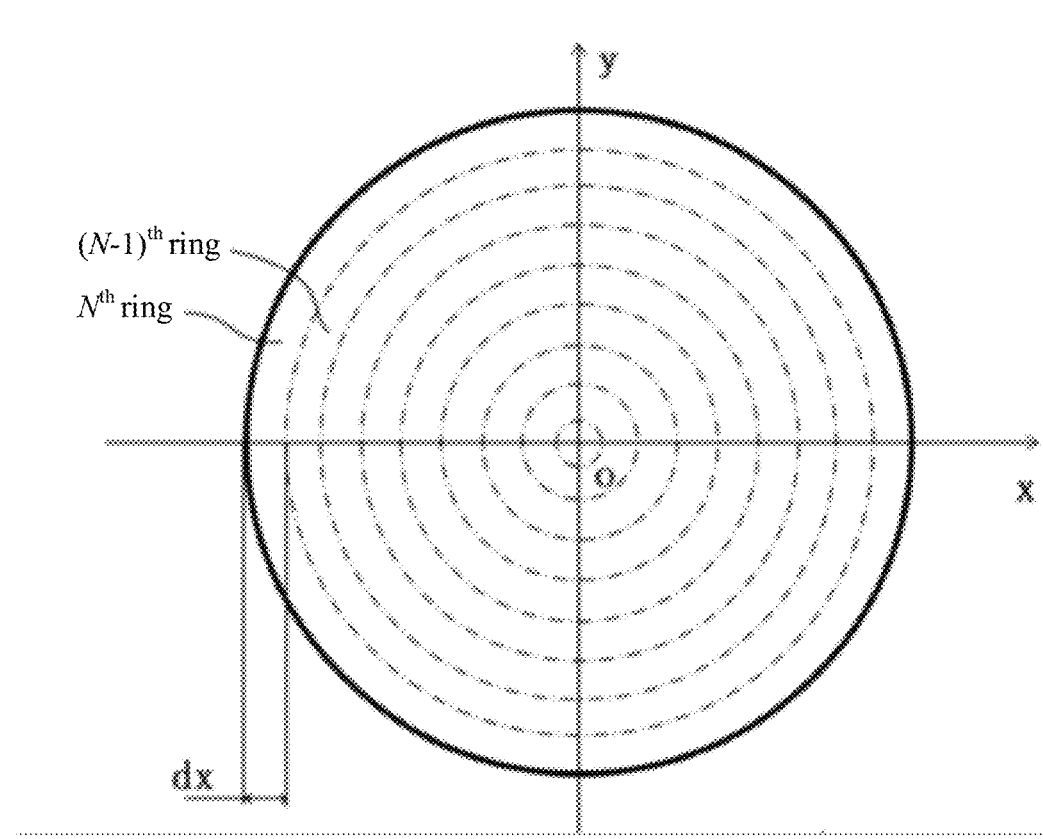
FIG. 2 is a schematic diagram illustrating discrete and equally spaced rings of an aspheric surface.
Figure 3:
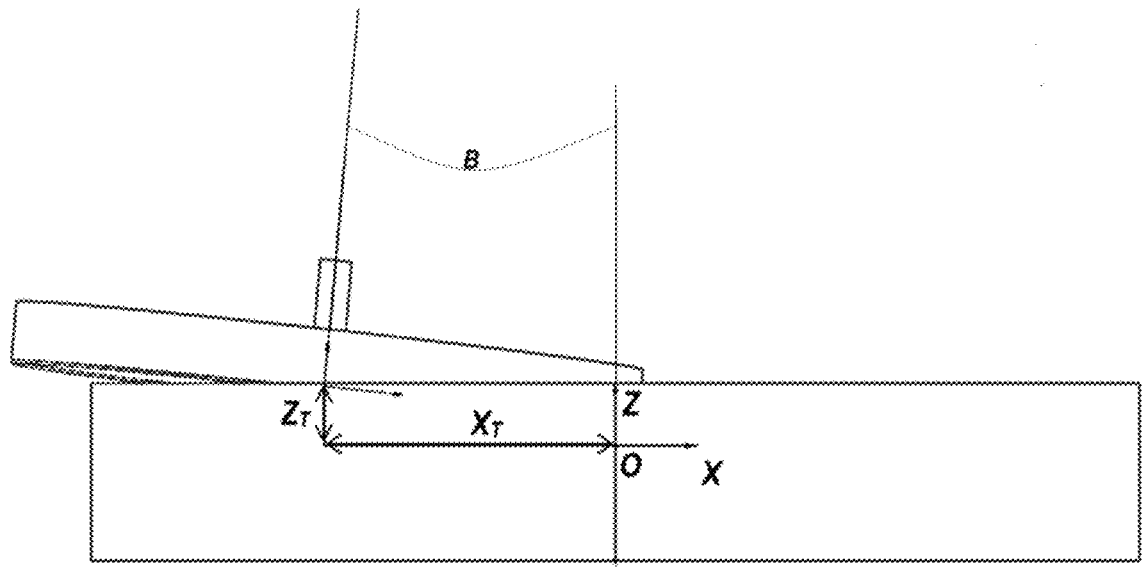
FIG. 3 is a schematic diagram illustrating positions of tool location points of an annular tool.

A method for numerical control milling and forming of a large-diameter aspheric lens is provided. An equation of the generatrix equation f1 of the aspheric lens is: $z^2=2*R_0*x-(1+k)*x^2$, where $R_0$ is a curvature radius of a vertex of the aspheric surface, k is a quadratic conic coefficient, x is an independent variable on the horizontal coordinate, and z is a vertical coordinate corresponding to the x coordinate. A numerical control machine tool for milling has positioning accuracy of β, and the machining steps of the aspheric lens are sequentially as follows:

1) machining a primary spherical surface with a radius $R_0$, a center thickness $H_1$, and a diameter D on an aspheric lens body material based on the curvature radius $R_0$ of the vertex, the center thickness $H_0$, and the diameter D of the aspheric surface, where $0 \le H_1 - H_0 \le 0.5$;

2) securing the aspheric lens body in step 1) on a turntable of the numerical control machine tool, and enabling an optical axis of the aspheric lens body to coincide with a rotation axis of the turntable of the numerical control machine tool, where the numerical control machine tool has at least two translation motion axes: an X-axis and a Z-axis, and two rotation axes: a B-axis and a C-axis, where the B-axis is the rotation axis around the Y-axis, the C-axis is the rotation axis around the Z-axis, and the rotation axis of the turntable of the numerical control machine tool is located at the C-axis; a spindle of the numerical control machine tool is located at the Z-axis;

3) installing an annular tool on the spindle of the numerical control machine tool, as shown in FIG. 1, where the annular tool has an outer diameter of $T_D$; and a convex rounded chamfer between the outer diameter and an inner diameter of the annular tool has a radius of $r_0$; the thickness between the outer diameter and the inner diameter of the annular tool is $2r_0$; $T_D > D/2$; and establishing an origin of a workpiece coordinate system at a vertex of the primary spherical surface, where the annular tool is a hollow grinding wheel tool, including: an electroplated diamond grinding wheel, a bronze adhesive grinding wheel and a resin grinding wheel;

4) as shown in FIG. 2, discretizing the aspheric surface into N rings equally spaced in the X-axis direction, where N is an integer, any ring has a width of dx=D/N, the corresponding aspheric diameter of the $n^{th}$ ring is: $n*dx$, and the $n^{th}$ ring has a curvature radius of $R_n$=sqrt$(R_0^2-k*(n*dx)^2)$, where n is the ordinal number of any ring from the first ring to the $N^{th}$ ring;

dx is jointly determined by the $N^{th}$ ring, the $(N-1)^{th}$ ring, the positioning accuracy β, and the generatrix equation f1 of the aspheric lens:

the generatrix equation of the $(N-1)^{th}$ ring is denoted as f2, the generatrix equation of the $N^{th}$ ring is denoted as f3, the intersection of f1 and f3 is denoted as (x1, z1), the intersection of f1 and f2 is denoted as (x2, z2), the intersection of f2 and f3 is denoted as (x3, z3), and the point on the generatrix equation f1 of the aspheric lens at x3 on the X-axis is denoted as (x3, z4), where x1=D/2, z4−z3=β, x2=x1−dx, and dx is calculated from the above geometric relationship; and 5) using the annular tool on the numerical control machine tool to sequentially machine the first ring to the $N^{th}$ ring, where when the $n^{th}$ ring is machined, the C-axis rotates continuously and uniformly, as shown in FIG. 3, and based on the positional relationship between the annular tool and the aspheric workpiece shown in FIG. 3, the X-axis coordinate and the Z-axis coordinate of the tool center in the workpiece coordinate system are deduced as follows respectively:

$$X_T=(((T_D-2*r_0)+2*r_0*\sin(B))/2)*\cos(B),$$

when k≠−1:

$$Z_T=R_0/(1+k)+k/(1+k)*\text{sqrt}(R_0^2-(1+k)*(n*dx)^2)-\text{sqrt}(R_0^2-k*(n*dx)^2)+(((T_D-2*r_0)+2*r_0*\sin(B))/2)*\sin(B),$$

and when k=−1:

$$Z_T=R_0+(n*dx)^2/(2*R_0)-\text{sqrt}(R_0^2+(n*dx)^2)+(((T_D-2*r_0)+2*r_0*\sin(B))/2)*\sin(B); \text{ and}$$

for the B-axis coordinate:

$$B=\text{asin}((T_D-2*r_0)/(2*(R_n-r_0))).$$

The convex rounded chamfer area of the annular grinding wheel tool is usually attached with abrasives such as emery, and is used as a cutting edge during machining to grind a glass material that comes into contact therewith. Tool location points of the tool center are located at B, $X_T$ and $Z_T$. During the machining process, the cutting edge of the annular grinding wheel tool is always located on the rotation center axis of the workpiece. When machining is performed from the first ring to the $N^{th}$ ring, the whole machining process is shown as follows: the grinding wheel moves up and down along the center axis of rotation and swings by a corresponding angle B in different positions. Even if the tool center $X_T$ is different when different rings are machined, the cutting edge of the tool does not deviate from the rotation center axis of the workpiece.

where * is a multiplication operator, sqrt is a square root calculation operator, and sin, cos and a sin are sine, cosine and arc sine operators respectively.

Figure 4:
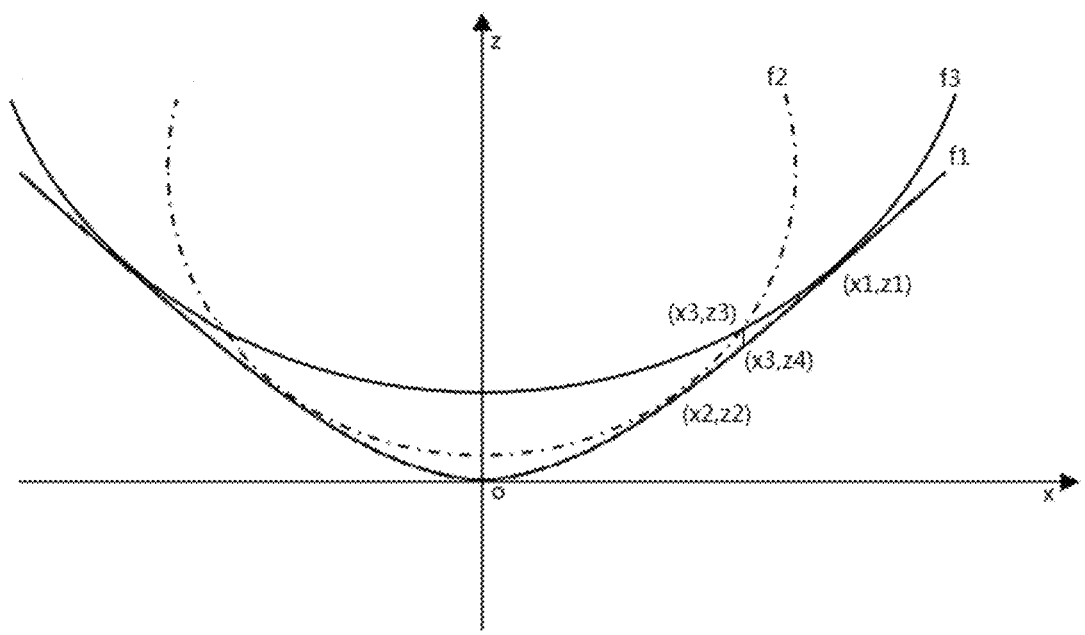
FIG. 4 is a schematic diagram of solving a ring width dx.

The specific dx solution is as follows: As shown in FIG. 4, quadratic aspheric surface equations $$x^2 = 2R_0 z - (1+k)z^2 \qquad f1:$$

$$(z - (R_0 - kz_1))^2 + x^2 = R_0^2 - kx_1^2 \qquad f2:$$

$$(z - (R_0 - kz_2))^2 + x^2 = R_0^2 - kx_2^2 \qquad f3:$$

an intersection between two circles is found
let f2−f3, obtain $$k(z_1 - z_2)(2z - (2R_0 - k(z_1 + z_2))) = k(x_2^2 - x_1^2)$$

$$\text{solve } z = \frac{x_2^2 - x_1^2}{2(z_1 - z_2)} + \left(R_0 - \frac{k(z_1 + z_2)}{2}\right)$$

substituted by the quadric surface equation:

$$z = \frac{z_1 + z_2}{2}$$

$$x = \sqrt{R_0^2 - kx_1^2 - \left(\frac{z_1 + z_2}{2} - (R_0 - kz_1)\right)^2}$$

$$x^2 = R_0^2 - kx_1^2 - \left(\frac{z_1 + z_2}{2} - (R_0 - kz_1)\right)^2$$

therefore, $$(x3, z3) \text{ is } \left(\sqrt{R_0^2 - kx_1^2 - \left(\frac{z_1 + z_2}{2} - (R_0 - kz_1)\right)^2},\ \frac{z_1 + z_2}{2}\right)$$

x3 is substituted into the quadric generatrix equation to obtain z4.
Based on the quadric surface formula $$x^2 = 2R_0 z - (1+k)z^2 \qquad f1:$$

the rooting formula can be used to obtain:

$$z = \frac{R_0 - \sqrt{R_0^2 - (1+k)x^2}}{1+k}$$

x3 is substituted into z4

$$z4 = \frac{R_0 - \sqrt{\frac{R_0^2 - (1+k)}{\left(R_0^2 - kx_1^2 - \left(\frac{z_1 + z_2}{2} + (R_0 - kz_1)\right)^2\right)}}}{1+k}$$

$$z1 = \frac{R_0 - \sqrt{R_0^2 - (1+k)x_1^2}}{1+k}$$

$$z2 = \frac{R_0 - \sqrt{R_0^2 - (1+k)(x_1 - dx)^2}}{1+k}$$

$$z3 - z4 = \frac{z_1 + z_2}{2} - \frac{R_0 - \sqrt{\frac{R_0^2 - (1+k)}{\left(R_0^2 - kx_1^2 - \left(\frac{z_1 + z_2}{2} - (R_0 - kz_1)\right)^2\right)}}}{1+k} = \beta$$

where $z1 + z2 = \dfrac{2R_0 - \sqrt{R_0^2 - (+k)x_1^2} - \sqrt{R_0^2 - (1+k)(x_1 - dx)^2}}{1+k}$ From this, the relational expression between dx and β is obtained. When $R_0$, k, the semi-diameter x1 and f are known, dx that meets the conditions can be solved.

Figure 5:
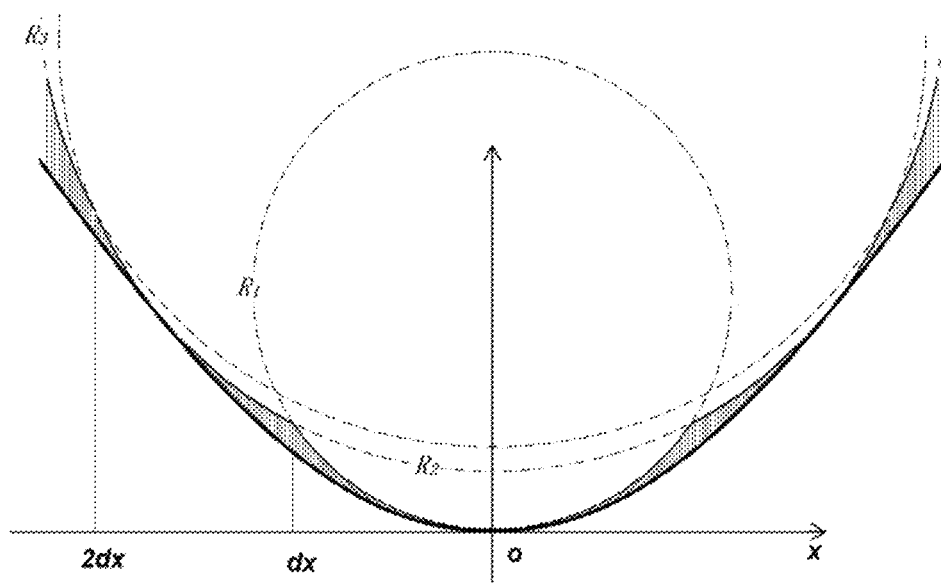
FIG. 5 is a schematic diagram illustrating an aspheric surface enveloped by a series of spherical rings.

In the solution, the aspheric surface is discretized into a series of annular rings with different radii, as shown in FIG. 5, the rings $R_1, R_2, R_3 \ldots$ are sequentially machined through generating cutting by using the annular grinding wheel tool, and the aspheric surface is enveloped by a large number of spherical rings. The number of the rings is much less than that of conventional machining screw pitches, and because in this solution, the increment dx in the x-direction of the tool path of different rings is limited by the positioning accuracy of the machine tool, i.e., the number of the rings is minimized, the shaded part in the figure shows the schematic residual between different rings and the actual aspheric surface, the maximum residual error of the different rings can be controlled within the positioning accuracy of the machine tool provided that the ring width is reasonably controlled.

Embodiment 2

Taking a specific aspheric surface as an example, the method in Embodiment 1 is further described. k=−0.98, $R_0$=3000, D=1000, machine tool positioning accuracy β=0.001.

A method for numerical control milling and forming of a large-diameter aspheric lens is provided, where a primary spherical surface with a radius of 3000, a center thickness $H_1$=200.2 and a diameter of 1000 is machined on an aspheric lens body material based on the curvature radius $R_0$=3000 of the vertex, the center thickness $H_0$=200 and the diameter D=1000 of the aspheric surface.

The annular tool is an electroplated diamond grinding wheel, with an outer diameter of $T_D$=550, and the convex rounded chamfer between the outer diameter and an inner diameter of the annular tool has a radius of $r_0$=5.

dx is solved from the $N^{th}$ ring, the $(N-1)^{th}$ ring, the positioning accuracy β, and the generatrix equation of the aspheric lens.

For dx=30.9 calculated from the relationship, N=17 is obtained after rounding, and it is recalculated to obtain dx=29.4112; and $R_n$, B, $X_T$ and $Z_T$ calculated under different ring ordinal numbers using the solution in Embodiment 1 are shown in Table 1.

It can be learned from Table 1 that an aspheric surface with a diameter of 1000 can be enveloped by using only 17 rings with a width of 29.4112. During the whole machining process, the B-axis angle of the machine tool ranges from 5.172° to 5.103°, with a variation of 0.069°; the machine tool X-axis changes in a range of 269.3496 to 269.3728, with a variation of 0.0232; and the machine tool Z-axis changes in a range of 24.3800 to 24.2850, with a variation of 0.095.

TABLE 1

Ring curvature radii, B, $X_T$ and $Z_T$ corresponding to different ring ordinal numbers

| Ring ordinal number n | $R_n$ | B, with a unit being degree | $X_T$ | $Z_T$ |
| --- | --- | --- | --- | --- |
| 1 | 3000.14128305847 | 5.17200629931126 | 269.349606399328 | 24.3800543493219 |
| 2 | 3000.56509231960 | 5.17127257598519 | 269.349855076213 | 24.3766502520008 |
| 3 | 3001.27130809688 | 5.17005039701697 | 269.350269204175 | 24.3711157227581 |
| 4 | 3002.25973110051 | 5.16834080055154 | 269.350848283963 | 24.3636590059685 |
| 5 | 3003.53008271821 | 5.16614523656417 | 269.351591618667 | 24.3545712344803 |
| 6 | 3005.08200540723 | 5.16346556345177 | 269.352498315739 | 24.3442260215403 |
| 7 | 3006.91506319597 | 5.16030404367734 | 269.353567289577 | 24.3330789392348 |
| 8 | 3009.02874229390 | 5.15666333848735 | 269.354797264659 | 24.3216668839150 |
| 9 | 3011.42245180749 | 5.15254650172625 | 269.356186779202 | 24.3106073313538 |
| 10 | 3014.09552456008 | 5.14795697277598 | 269.357734189330 | 24.3005974844438 |
| 11 | 3017.04721801292 | 5.14289856865239 | 269.359437673738 | 24.2924133153022 |
| 12 | 3020.27671528443 | 5.13737547529366 | 269.361295238809 | 24.2869085054286 |
| 13 | 3023.78312626461 | 5.13139223807930 | 269.363304724182 | 24.2850132875273 |
| 14 | 3027.56548882090 | 5.12495375162105 | 269.365463808719 | 24.2877331921918 |
| 15 | 3031.62277009187 | 5.11806524887000 | 269.367770016859 | 24.2961477035142 |
| 16 | 3035.95386786479 | 5.11073228958621 | 269.370220725314 | 24.3114088283671 |
| 17 | 3040.55761203275 | 5.10296074821945 | 269.372813170093 | 24.3347395827187 |

Figure 6:
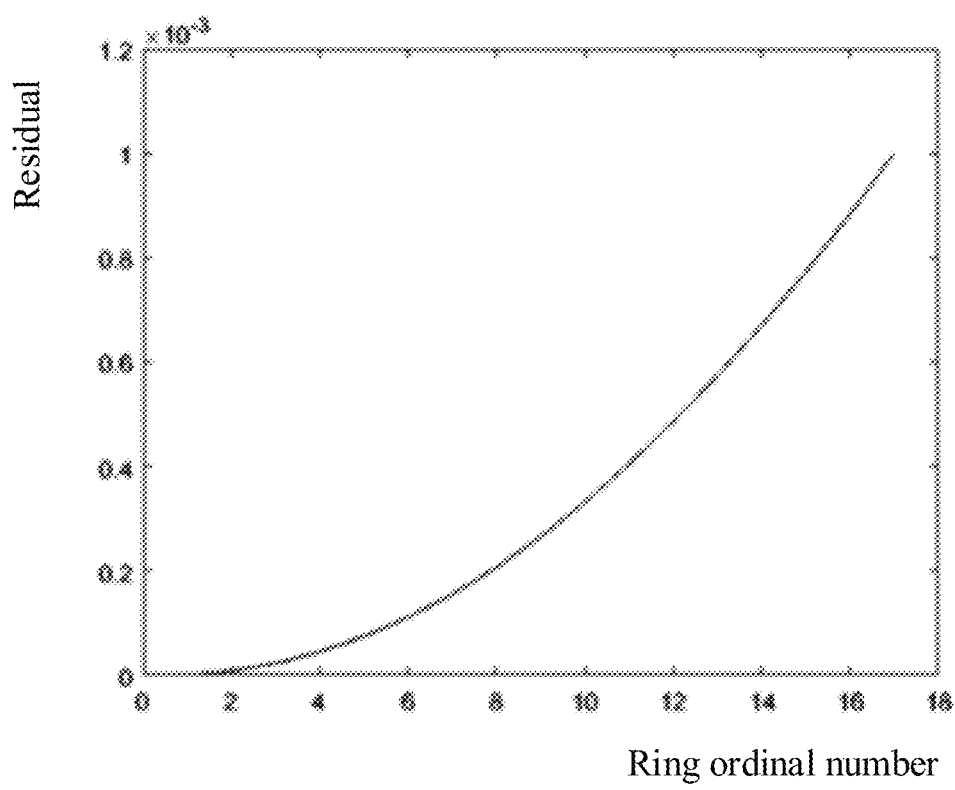
FIG. 6 is a schematic diagram illustrating an example of a ring ordinal number residual relationship.

From the residual error curve from the first ring to the $N^{th}$ ring shown in FIG. 6, it can be learned that the residual shows a monotonically increasing trend as N increases, and the maximum residual does not exceed the positioning accuracy of the machine tool axis. When the $n^{th}$ ring is machined, the ring can be machined only by placing tool location points at $X_T$ and $Z_T$, enabling an included angle between the tool axis and the rotation axis of the turntable of the numerical control machine tool to be B, and rotating the C-axis by more than 360°, and a target aspheric surface can be obtained only by machining 17 rings with different radii at 17 different positions respectively. A smaller distance between rings indicates a smaller residual, but lower machining efficiency. This method defines the residual as not exceeding the positioning accuracy of the machine tool, which can not only meet the machining accuracy, but also improve the machining efficiency. In this embodiment, an aspheric surface can be spliced and enveloped by using 17 spherical rings with different curvature radii, and the efficiency is greatly improved compared with that of the prior art with a screw pitch of 0.2 mm. In addition, in this method, the surface shape errors of the machined aspheric surface all come from the outer diameter $T_D$, and the radius $r_0$ of the convex rounded chamfer between the outer diameter and the inner diameter of the annular tool. During the compensation machining, compensation can be implemented only by adjusting the two tool parameters. In conventional machining, a small tool is used and has a large tool movement stroke, which requires a large axis stroke and high long-distance positioning accuracy of the machine tool. The B-axis, the X-axis, and the Z-axis in this application change in a quite small range. Only a quite small part of a shaft is used, thus lowering requirements for the straightness of an entire machine tool shaft.

Figure 7A:
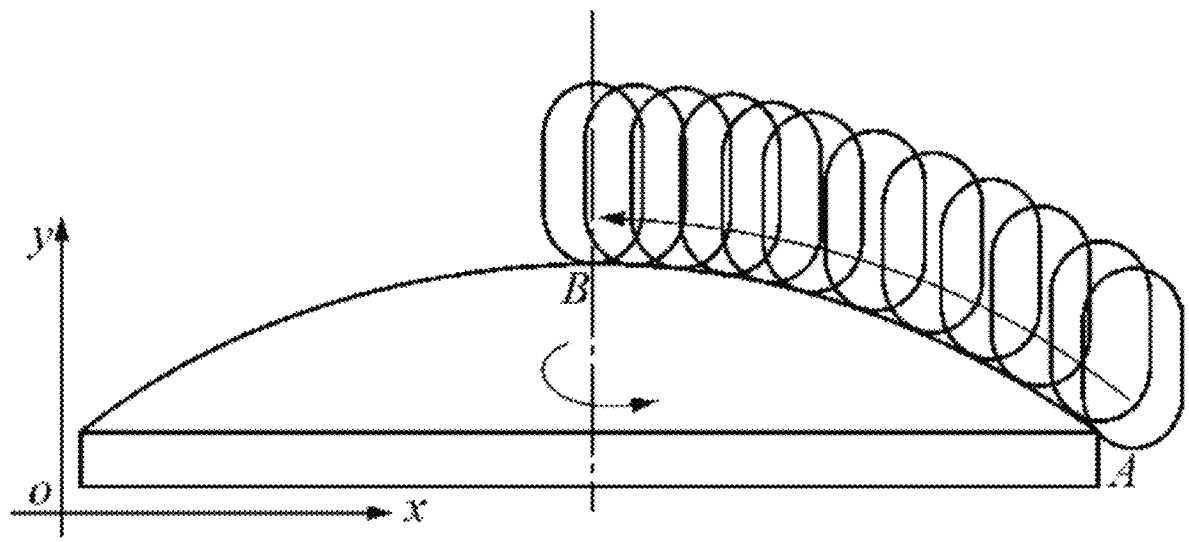
FIG. 7a is a front view illustrating a principle of arc envelope grinding of a rotary aspheric surface.
Figure 7B:
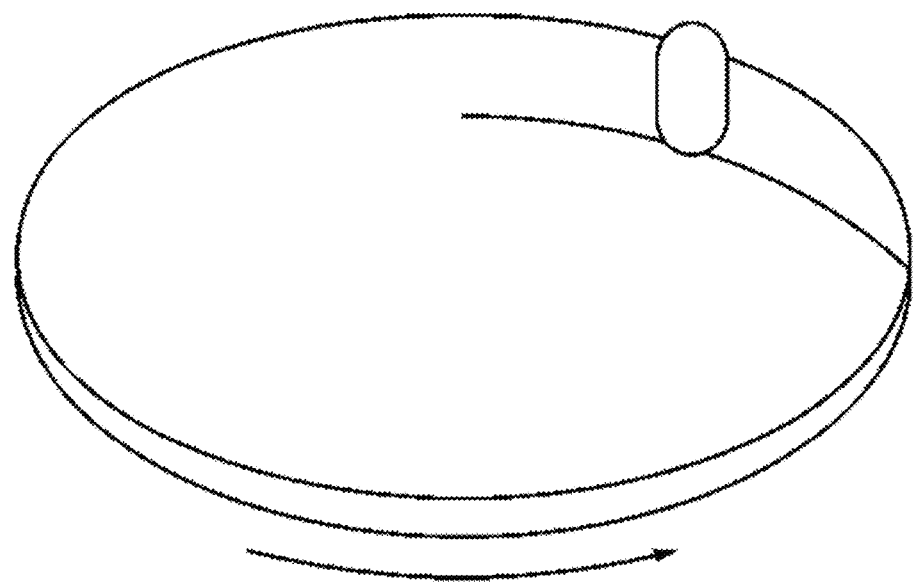
FIG. 7b is an oblique view illustrating a principle of arc envelope grinding of a rotary aspheric surface.

For comparison, the reference document: Zhou Xuguang, Yan Qiusheng, Kong Lingye, Zhu Guangli. Effect of Wheel Geometry Parameters in Grinding Aspheric with AEGM [J]. Tool Engineering. Issue 8, 2015 proposed a precision grinding method for machining a concave-convex axisymmetric rotary curved surface by using an arc envelope grinding method. In a process of arc envelope grinding of an aspheric surface, the shape accuracy of the arc-shaped cross-section of a disc-shaped grinding wheel is copied on the curved surface of a part, and thus keeping a high-accuracy arc-shaped cross-section of the disc-shaped grinding wheel is a significant part of high-accuracy arc envelope grinding of an aspheric surface. The principle of arc envelope grinding is shown in FIG. 7. In the process of arc envelope grinding of an axisymmetric rotary aspheric surface, the aspheric surface rotates around a symmetry axis thereof, and the arc part of the disc-shaped grinding wheel moves along a meridian cross-section curve AB of the axisymmetric rotary aspheric surface. In grinding, the arc part of the grinding wheel is always tangent to the aspheric surface, and a grinding point of the grinding wheel moves continuously along the arc cross-section of the grinding wheel. If the aspheric surface with the diameter of 1000 in this embodiment is machined using the solution of this reference document, the X-axis movement amount corresponding to the aspheric meridian cross-section curve AB is at least 500 mm, and the vector height at the edge of the aspheric lens is f1(500)=41.6725, so the Z-axis movement amount corresponding to the meridian cross-section curve AB of the spherical surface is at least 41.6725 mm. Currently, surface quality and machining efficiency are two requirements to be met in the research of tool path planning, but the two requirements are contradictory in the planning process and need to be met at the same time. If the distance between adjacent tool paths is excessively large, the surface quality of a workpiece cannot meet requirements on, e.g., roughness, but if the distance is excessively small, the time required for machining is greatly increased, and the efficiency inevitably cannot reach the standard. Therefore, when large-diameter aspheric surfaces, especially meter-scale aspheric surfaces are machined in the technical solutions of the prior art, it is required that a linear axis of a machine tool has a higher positioning accuracy in the stroke, and a larger diameter inevitably increases the machining time. Taking a conventional screw pitch of 0.2 mm as an example, the C-axis of the machine tool rotates by at least 2500 turns, and the length of a tool path line is far beyond dx=29.4112 mm in this application, the length of 17 turns around the C-axis of the machine tool; and when the disc-shaped grinding wheel tool is used to machine a meter-scale large-diameter aspheric surface, the tool wear and machine tool shaft positioning errors are main factors that affect the accuracy of aspheric surface machining. In the solution of the present invention, the aspheric surface is enveloped by using several spherical rings, and the widths of the rings are set reasonably, which not only ensures the machining efficiency, but also greatly reduces the length of the tool path. In this solution, the axis movement of the machining machine tool is quite little, and errors caused by machine tool positioning may be ignored, and therefore the machining accuracy can be improved.

Embodiment 3

A device for numerical control milling and forming of a large-diameter aspheric lens is provided. An aspheric lens has a generatrix equation f1 of $z^2=2*R_0*x-(1+k)*x^2$, where $R_0$ is a curvature radius of a vertex of the aspheric surface, k is a quadratic conic coefficient, x is an independent variable on the horizontal coordinate, z is a vertical coordinate corresponding to the x coordinate, and the diameter is D; and the numerical control machine tool for milling has positioning accuracy of $\beta$. The numerical control machine tool has at least two translation motion axes: an X-axis and a Z-axis, and two rotation axes: a B-axis and a C-axis, where the B-axis is the rotation axis around the Y-axis, the C-axis is the rotation axis around the Z-axis, and the rotation axis of the turntable of the numerical control machine tool is located at the C-axis; a spindle of the numerical control machine tool is located at the Z-axis; the annular tool is installed on the spindle of the numerical control machine tool; the annular tool has an outer diameter of $T_D$; a convex rounded chamfer between the outer diameter and an inner diameter of the annular tool has a radius of $r_0$; and $T_D>D/2$. The aspheric surface is discretized into N rings equally spaced in the X-axis direction, any ring has a width of dx=D/N, the corresponding aspheric diameter of the $n^{th}$ ring is: n*dx, and the $n^{th}$ ring has a curvature radius of $R_n=\text{sqrt}(R_0^2-k*(n*dx)^2)$, where n is the ordinal number of any one of the first ring to the $N^{th}$ ring.

The annular tool on the numerical control machine tool is used to sequentially machine the first ring to the $N^{th}$ ring, where when the $n^{th}$ ring is machined, the C-axis rotates continuously and uniformly, and the X-axis coordinate of the tool center in the workpiece coordinate system is:

$X_T=(((T_D-2*r_0)+2*r_0*\sin(B))/2)*\cos(B).$

For the Z-axis coordinate: when $k \neq -1$:

$Z_T=R_0/(1+k)+k/(1+k)*\text{sqrt}(R_0^2-(1+k)*(n*dx)^2)-\text{sqrt}(R_0^2-k*(n*dx)^2)+(((T_D-2*r_0)+2*r_0*\sin(B))/2)*\sin(B),$ and when $k=-1$:

$Z_T=R_0+(n*dx)^2/(2*R_0)-\text{sqrt}(R_0^2+(n*dx)^2)+(((T_D-2*r_0)+2*r_0*\sin(B))/2)*\sin(B).$ For the B-axis coordinate:

$B=\text{asin}((T_D-2*r_0)/(2*(R_n-r_0))),$ where * is a multiplication operator, sqrt is a square root calculation operator, and sin, cos and a sin are sine, cosine and arc sine operators respectively.

Embodiment 4

A method for numerical control milling and forming of an off-axis aspheric lens is provided, where an equation of the generatrix equation f1 of the aspheric surface is: $z^2 2*R_0*x-(1+k)*x^2$, where $R_0$ is a curvature radius of a vertex of the aspheric surface, k is a quadratic conic coefficient, an off-axis amount is y, x is the independent variable on the horizontal coordinate, and z is the vertical coordinate corresponding to the x coordinate. An aspheric parent mirror including the off-axis aspheric lens has a diameter of D, a numerical control machine tool for milling has positioning accuracy of $\beta$, and the machining steps of the off-axis aspheric lens are sequentially as follows.

1) Prepare a mirror body enveloping the off-axis aspheric lens according to contour geometric parameters of the off-axis aspheric lens, where upper and lower end faces of the mirror body are parallel to each other.

Figure 8:
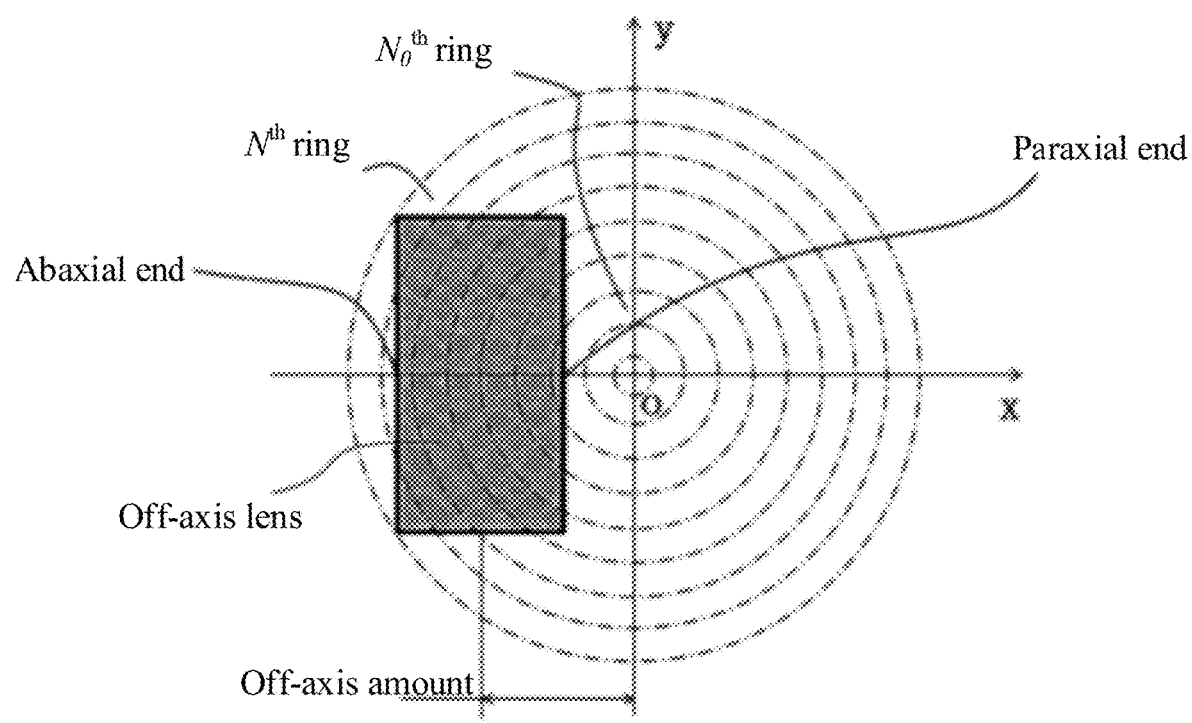
FIG. 8 is a schematic diagram illustrating a relationship between a rectangular off-axis aspheric lens and a parent mirror thereof.

2) Secure the mirror body in step 1) on a turntable of the numerical control machine tool, where the numerical control machine tool has at least two translation motion axes: an X-axis and a Z-axis, and two rotation axes: a B-axis and a C-axis, where the B-axis is the rotation axis around the Y-axis, the C-axis is the rotation axis around the Z-axis, and a rotation axis of the turntable of the numerical control machine tool is located at the C-axis; a spindle of the numerical control machine tool is located at the Z-axis; as shown in FIG. 8, the projection of a line connecting a paraxial end and an abaxial end of the mirror body on the turntable of the numerical control machine tool coincides with the X-axis; and the distance between the center of the mirror body and the rotation axis of the turntable of the numerical control machine tool is equal to the off-axis amount y.

3) Install an annular tool on the spindle of the numerical control machine tool, where the annular tool has an outer diameter of $T_D$; and a convex rounded chamfer between the outer diameter and an inner diameter of the annular tool has a radius of $r_0$; $T_D>D/2$; establish an origin of a workpiece coordinate system at a vertex of the primary spherical surface, where the annular tool is a hollow grinding wheel tool, including: an electroplated diamond grinding wheel, a bronze adhesive grinding wheel and a resin grinding wheel; regard the mirror body as part of the aspheric parent mirror, and use generating cutting to directly machine the mirror body into a spherical surface with a curvature radius of $R_0$.

Figure 9:
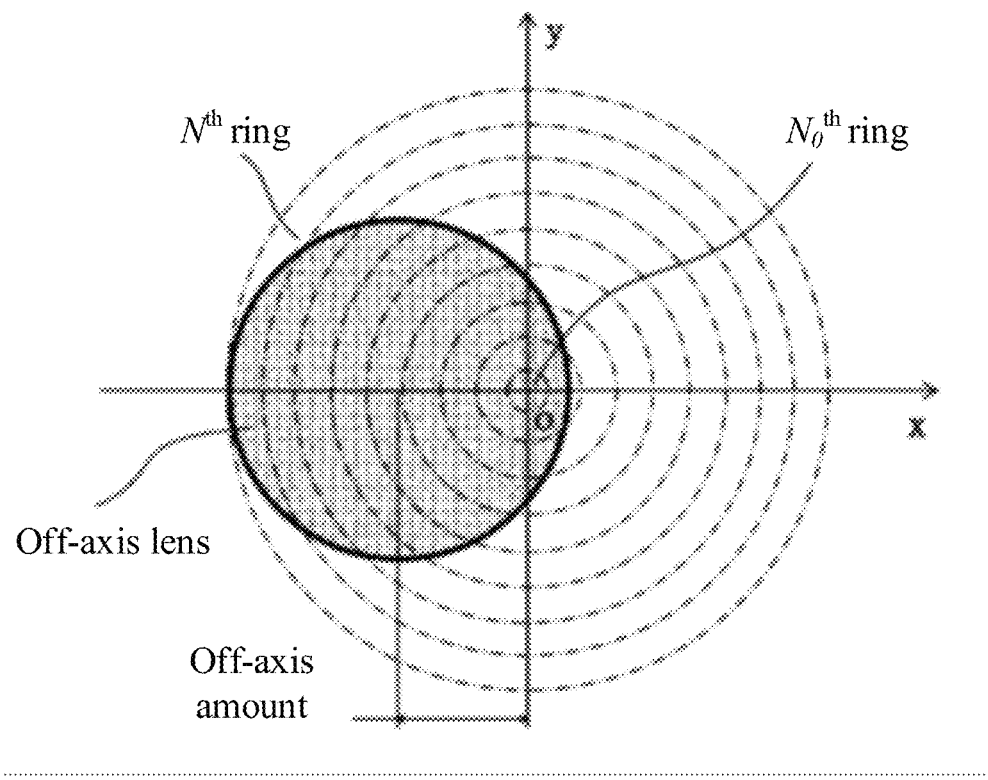
FIG. 9 is a schematic diagram illustrating a relationship between a circular off-axis aspheric lens and a parent mirror thereof.

4) Discretize the aspheric parent mirror into N rings equally spaced in the X-axis direction, where N is an integer, any ring has a width of dx=D/N, the corresponding aspheric diameter of the $n^{th}$ ring is: n*dx, and the $n^{th}$ ring has a curvature radius of $R_n=\text{sqrt}(R_0^2-k*(n*dx)^2)$, where n is the ordinal number of any ring from the first ring to the $N^{th}$ ring.

dx is jointly determined by the $N^{th}$ ring, the $(N-1)^{th}$ ring, the positioning accuracy $\beta$, and the generatrix equation f1 of the aspheric lens:

the generatrix equation of the $(N-1)^{th}$ ring is denoted as f2, the generatrix equation of the $N^{th}$ ring is denoted as f3, the intersection of f1 and f3 is denoted as (x1, z1), the intersection of f1 and f2 is denoted as (x2, z2), the intersection of f2 and f3 is denoted as (x3, z3), and the point on the generatrix equation f1 of the aspheric lens at x3 on the X-axis is denoted as (x3, z4), where x1=D/2, z4−z3=$\beta$, x2=x1−dx, and dx is calculated from the above geometric relationship; according to the diameter of the off-axis aspheric lens, obtain the ring ordinal number range $N_0$−N of the off-axis aspheric lens; FIG. 8 is a schematic diagram illustrating a relationship between a rectangular off-axis aspheric lens and a parent mirror thereof, FIG. 9 is a schematic diagram illustrating a relationship between a circular off-axis aspheric lens and a parent mirror thereof; and it can be learned from the figures that the ring ordinal number range can be obtained according to the positional relationship between the off-axis mirror and the parent mirror.

5) Use the annular tool on the numerical control machine tool to sequentially machine the No1 ring to the $N^{th}$ ring, where when the $n^{th}$ ring is machined, the C-axis rotates continuously and uniformly, and the X-axis coordinate and the Z-axis coordinate of the tool center in the workpiece coordinate system are deduced as follows respectively:

For the X-axis coordinate:

$$X_T = (((T_D - 2*r_0) + 2*r_0*\sin(B))/2)*\cos(B).$$

For the Z-axis coordinate: when $k \neq -1$:

$$Z_T = R_0/(1+k) + k/(1+k)*\mathrm{sqrt}(R_0^2 - (1+k)*(n*dx)^2) - \mathrm{sqrt}(R_0^2 - k*(n*dx)^2) + (((T_D - 2*r_0) + 2*r_0*\sin(B))/2)*\sin(B),$$

and when $k = -1$:

$$Z_T = R_0 + (n*dx)^2/(2*R_0) - \mathrm{sqrt}(R_0^2 + (n*dx)^2) + (((T_D - 2*r_0) + 2*r_0*\sin(B))/2)*\sin(B).$$

For the B-axis coordinate:

$$B = a\sin((T_D - 2*r_0)/(2*(R_n - r_0))),$$

where * is a multiplication operator, sqrt is a square root calculation operator, and sin, cos and a sin are sine, cosine and arc sine operators respectively.

Figure 10:
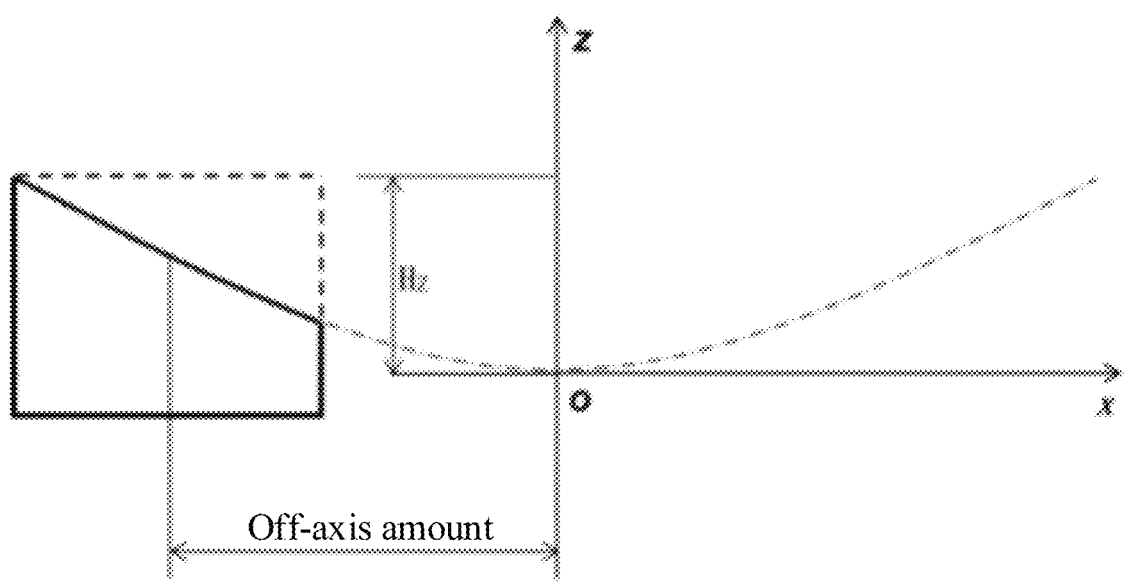
FIG. 10 is a schematic diagram illustrating an off-axis aspheric lens and a parent mirror generatrix thereof.

FIG. 10 is a schematic diagram illustrating a relationship between a two-dimensional curve between a paraxial end and an abaxial end of an off-axis aspheric lens and a parent mirror generatrix thereof. It can be learned from the figure that the off-axis aspheric lens is part of the aspheric parent mirror. When machined, the off-axis aspheric lens is placed on the turntable of the numerical control machine tool at a position that has a distance from the rotation axis equal to the off-axis amount, and then the off-axis aspheric lens can be machined by using the method of machining the aspheric parent mirror; when $R_0$ is machined through generating cutting, the depth of downward machining by the annular grinding wheel tool from the upper end face of the mirror body is the vector height Hz at the edge of the aspheric surface of the parent mirror with a diameter of D.

The present invention relates to the field of optical machining. To solve the problems of long time-consuming and severe tool wear in the machining of a meter-scale large-diameter aspheric surface, an aspheric surface is discretized into a series of rings with different radii, and the rings are sequentially machined through generating cutting by using an annular grinding wheel tool; the rings are equally spaced, there are a total of N rings, and the width of any ring is jointly determined by the $N^{th}$ ring, the $(N-1)^{th}$ ring, positioning accuracy, and a generatrix equation of the aspheric lens, and the $n^{th}$ ring has a curvature radius of $Rn = \mathrm{sqrt}(R0^2 - k*(n*dx)^2)$; and the aspheric surface is enveloped by a large number of rings. The tool used for machining has a diameter greater than the semi-diameter of the aspheric surface, and a contact area between the tool and the workpiece surface is rings. Therefore, when machining large-diameter aspheric surfaces, the large annular tool has a much longer service life than that of a tool in a conventional machining method; and the distance between the rings is much greater than a conventional machining screw pitch, and therefore the machining efficiency is significantly improved. The machining method of this solution can also be extended to off-axis aspheric machining and thus has strong practicability.

Letter symbols used in this solution are only simplified expressions to express the numerical relationship between the physical quantities thereof, and should not be construed as a special limitation to the solution.

What is claimed is:

1. A method for numerical control milling and forming of a large-diameter aspheric lens, the aspheric lens having a concave surface, with a generatrix equation being denoted as f1, the aspheric lens having a diameter of D, and a numerical control machine tool for milling having positioning accuracy of β, wherein an aspheric surface of the aspheric lens is discretized into a series of rings with different radii, the rings are equally spaced, there are a total of N rings, the rings each have a width of dx, and the rings are sequentially machined through generating cutting by using an annular grinding wheel tool with a diameter greater than a semi-diameter of the aspheric surface; a process of solving the ring width dx is as follows: a generatrix equation of a $(N-1)^{th}$ ring is denoted as f2, a generatrix equation of an $N^{th}$ ring is denoted as f3, an intersection of f1 and f3 is denoted as (x1, z1), an intersection of f1 and f2 is denoted as (x2, z2), an intersection of f2 and f3 is denoted as (x3, z3), a point on the generatrix equation f1 of the aspheric lens at x3 is denoted as (x3, z4), wherein x1=D/2, z4−z3=β, x2=x1−dx, and dx is calculated from the geometric relationship.

2. The method for numerical control milling and forming of a large-diameter aspheric lens according to claim 1, wherein an equation of the generatrix equation f1 of the aspheric lens is: $z^2 = 2*R_0*x - (1+k)*x^2$, wherein $R_0$ is a curvature radius of a vertex of the aspheric surface, k is a quadratic conic coefficient, x is an independent variable on the horizontal coordinate, and z is a vertical coordinate corresponding to the x coordinate; and the machining steps of the aspheric lens are sequentially as follows:

1) machining a primary spherical surface with a radius $R_0$, a center thickness $H_1$, and a diameter D on an aspheric lens body material based on the curvature radius $R_0$ of the vertex, the center thickness $H_0$, and the diameter D of the aspheric surface, wherein $0 \leq H_1 - H_0 \leq 0.5$;

2) securing the aspheric lens body in step 1) on a turntable of the numerical control machine tool, and enabling an optical axis of the aspheric lens body to coincide with a rotation axis of the turntable of the numerical control machine tool, wherein the numerical control machine tool has at least two translation motion axes: an X-axis and a Z-axis, and two rotation axes: a B-axis and a C-axis, wherein the B-axis is the rotation axis around the Y-axis, the C-axis is the rotation axis around the Z-axis, and the rotation axis of the turntable of the numerical control machine tool is located at the C-axis; a spindle of the numerical control machine tool is located at the Z-axis;

3) installing an annular tool on the spindle of the numerical control machine tool, wherein the annular tool has an outer diameter of $T_D$, and a convex rounded chamfer between the outer diameter and the inner diameter of the annular tool has a radius of $r_0$; $T_D > D/2$; and establishing an origin of a workpiece coordinate system at a vertex of the primary spherical surface;

4) discretizing the aspheric surface into N rings equally spaced in the X-axis direction, wherein N is an integer, any ring has a width of dx=D/N, the corresponding aspheric diameter of the $n^{th}$ ring is: n*dx, and the $n^{th}$ ring has a curvature radius of $R_n=\text{sqrt}(R_0^2-k*(n*dx)^2)$, wherein n is the ordinal number of any ring from the first ring to the $N^{th}$ ring;

dx is jointly determined by the $N^{th}$ ring, the $(N-1)^{th}$ ring, the positioning accuracy β, and the generatrix equation f1 of the aspheric lens:

the generatrix equation of the $(N-1)^{th}$ ring is denoted as f2, the generatrix equation of the $N^{th}$ ring is denoted as f3, the intersection of f1 and f3 is denoted as (x1, z1), the intersection of f1 and f2 is denoted as (x2, z2), the intersection of f2 and f3 is denoted as (x3, z3), and the point on the generatrix equation f1 of the aspheric lens at x3 on the X-axis is denoted as (x3, z4), wherein x1=D/2, z4−z3=β, x2=x1−dx, and dx is calculated from the above geometric relationship; and 5) using the annular tool on the numerical control machine tool to sequentially machine the first ring to the $N^{th}$ ring, wherein when the $n^{th}$ ring is machined, the C-axis rotates continuously and uniformly, and the X-axis coordinate of the tool center in the workpiece coordinate system is:

$$X_T=(((T_D-2*r_0)+2*r_0*\sin(B))/2)*\cos(B);$$

for the Z-axis coordinate:
when k≠−1:

$$Z_T=R_0/(1+k)+k/(1+k)*\text{sqrt}(R_0^2-(1+k)*(n*dx)^2)-\text{sqrt}(R_0^2-k*(n*dx)^2)+(((T_D-2*r_0)+2*r_0*\sin(B))/2)*\sin(B),$$

and when k=−1:

$$Z_T=R_0+(n*dx)^2/(2*R_0)-\text{sqrt}(R_0^2+(n*dx)^2)+(((T_D--2*r_0)+2*r_0*\sin(B))/2)*\sin(B); \text{ and}$$

for the B-axis coordinate:

$$B=a\ \sin((T_D-2*r_0)/(2*(R_n-r_0))),$$

where * is a multiplication operator, sqrt is a square root calculation operator, and sin, cos and a sin are sine, cosine and arc sine operators respectively.

3. The method for numerical control milling and forming of a large-diameter aspheric lens according to claim 1, wherein the annular tool is a hollow grinding wheel tool, comprising: an electroplated diamond grinding wheel, a bronze adhesive grinding wheel and a resin grinding wheel.

4. A method for numerical control polishing of a large-diameter aspheric lens, comprising: replacing the annular tool in the method for numerical control milling and forming of a large-diameter aspheric lens according to claim 1 with an annular polishing disk; installing the annular polishing disk on a spindle of a numerical control machine tool, wherein the annular polishing disk has an outer diameter of $T_D$, and a convex rounded chamfer between the outer diameter and an inner diameter of the annular polishing disk has a radius of $r_0$; $T_D>D/2$; establishing an origin of a workpiece coordinate system at a vertex of a primary spherical surface; using the annular polishing disk on the numerical control machine tool to sequentially machine the first ring to the $N^{th}$ ring, and spraying a polishing powder solution between the annular polishing disk and the large-diameter aspheric lens during the machining process, wherein the polishing powder solution is generally selected from a group consisting of aluminum oxide, cerium oxide, diamond micro powder and white corundum micro powder based on hardness of a material to be polished.

5. The method for numerical control polishing of a large-diameter aspheric lens according to claim 4, wherein the annular polishing disk comprises: an annular polyurethane polishing pad, an annular flexible polishing skin and an annular airbag.

* * * * *